350-276
SR
1/24/84 OR 4,427,264

United States Patent [19] [11] 4,427,264
Kamerling [45] Jan. 24, 1984

[54] MOUNTING FOR OPTICAL ANTIGLARE PANEL AND ASSEMBLY INCLUDING THE SAME

[75] Inventor: Marc A. Kamerling, Santa Rosa, Calif.

[73] Assignee: Optical Coating Laboratory, Inc., Santa Rosa, Calif.

[21] Appl. No.: 224,161

[22] Filed: Jan. 12, 1981

[51] Int. Cl.[3] .................................... G02B 27/00
[52] U.S. Cl. .......................... 350/276 R; 358/252; 358/253
[58] Field of Search ................ 350/276 R; 358/252, 358/253

[56] References Cited

U.S. PATENT DOCUMENTS

| | | | |
|---|---|---|---|
| 3,031,526 | 4/1962 | Oberstein | 358/252 |
| 3,418,426 | 12/1968 | Schlegel et al. | 358/252 |
| 3,582,189 | 6/1971 | Moritz et al. | 358/252 |
| 4,354,205 | 10/1982 | Lowe et al. | 358/253 |

FOREIGN PATENT DOCUMENTS

| | | | |
|---|---|---|---|
| 1195731 | 11/1959 | France | 358/253 |
| 652283 | 2/1963 | Italy | 358/253 |
| 1022727 | 3/1966 | United Kingdom | 358/252 |

*Primary Examiner*—John K. Corbin
*Assistant Examiner*—Rebecca D. Gass
*Attorney, Agent, or Firm*—Flehr, Hohbach, Test, Albritton & Herbert

[57] ABSTRACT

A mounting device for mounting an optical panel on the front side of a housing which contains means having an illuminated display area and a bezel on its front side that frames the display area, the bezel having holes located in spaced regions, the device comprising a body having front and rear sides, means carried by the body and projecting from the rear side of the same dimension to be received in one of said holes and to be retained therein, and means for removably attaching the contiguous surface of an applied panel to the front side of the body.

2 Claims, 5 Drawing Figures

MOUNTING FOR OPTICAL ANTIGLARE PANEL AND ASSEMBLY INCLUDING THE SAME

This invention relates generally to mountings for optical antiglare panels such as are used with visual display means, such as means of the electron beam type, and to assemblies which employ such mountings.

Optical translucent panels are frequently secured to visual display means, in such a manner as to extend over the front of the display area, the purpose being to reduce glare. The term visual display means has reference to such equipment as computer or data retrieval terminals which generally employ display means of the scanning electron tube type. In the past it has been common to removably attach the panel by the use of clip-like mounting devices that are permanently attached to one side of the panel and which are removably attached to the bezel that surrounds the display area of the electron beam tube. Such mounting means have a number of disadvantages. For example, when the mounting devices are removed from the terminal, they remain attached to and project from one side of the panel, thus making it impossible to lay that side of the panel on a flat surface, as is desirable during cleaning of the front surface. Also, such projecting mounting devices may be broken during cleaning, handling or storage, or during positioning the panel on the display means.

It is an object of the present invention to provide mounting devices and an assembly which makes possible removal of the panel without removal of the mounting devices, thus avoiding the above difficulties encountered with prior devices.

Another object is to provide an assembly including a visual display means and an antiglare panel, which incorporates such mounting means.

Another object is to provide mounting means which serves to removably mount an antiglare panel simply by manually pressing the panel against mounting devices carried by the visual display means.

In general, the present invention consists of a plurality of mounting devices for securing an optical panel on the front side of visual display means which has a bezel surrounding the display area of an electron beam tube or other illuminated display means, the bezel having holes located in spaced regions. Each mounting device consists of a body having means which is dimensioned and adapted to be received in one of the holes in the bezel, and to be retained therein. Additional means serves to removably attach the contiguous surface of an applied panel to the front side of each body, simply by pressing the panel against the mounting devices.

The means employed for this purpose is fastening means of the hook and loop type. Also, the invention is incorporated in a complete assembly consisting of such visual display means, an antiglare optical panel, and such mounting devices for removably securing the panel over the display area.

Additional objects and features of the invention will appear from the following description in which the preferred embodiment is disclosed in conjunction with the accompanying drawing.

Referring to the drawing.

Figure 1:
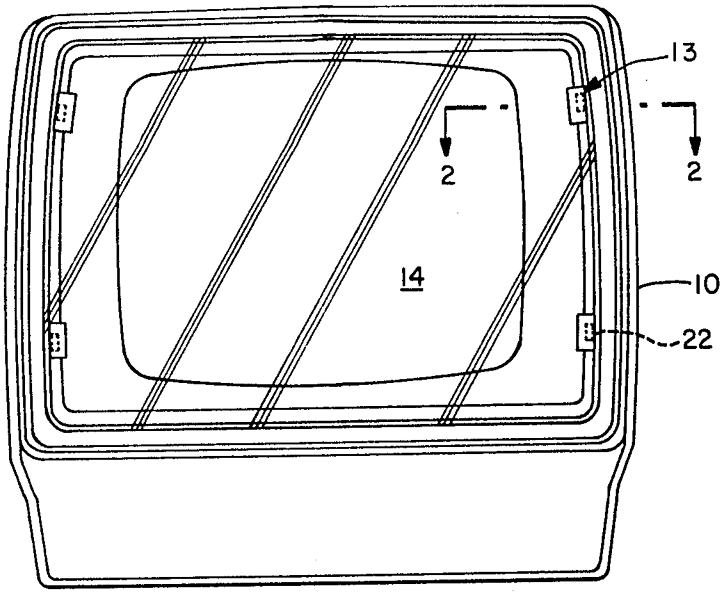
FIG. 1 is a front view of a terminal module such as may be employed with a computer or data retrieval system.

The assembly illustrated in FIG. 1 consists of a housing 10 which serves to house a display tube, such as one of the electron beam-type. A portion of this tube is indicated at 11 in FIG. 2. The display area of the tube is surrounded by the bezel 12, which ordinarily is made of plastic. A plurality of mounting devices 13 are carried by the bezel 12, and are removably secured to the antiglare optical panel 14. The panel is generally flat and may be made of laminated glass.

Figure 2:
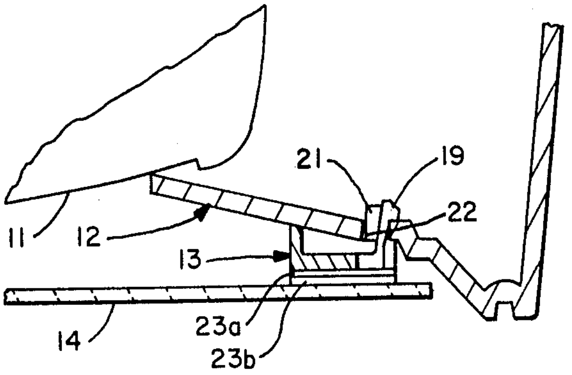
FIG. 2 is an enlarged cross-sectional detail taken along the line 2—2 of FIG. 1.
Figure 3:
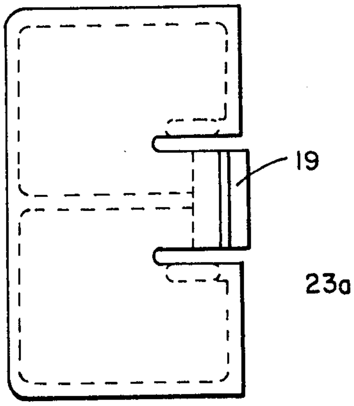
FIG. 3 is a front view of one of the mounting devices for mounting an optical antiglare panel upon the module.
Figure 4:
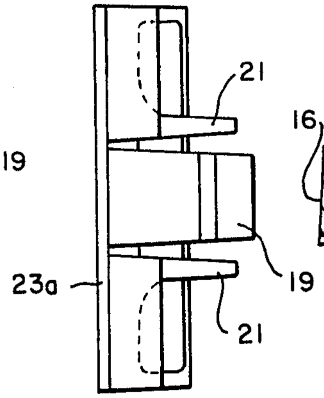
FIG. 4 is a view looking toward the right-hand edge of FIG. 3.
Figure 5:
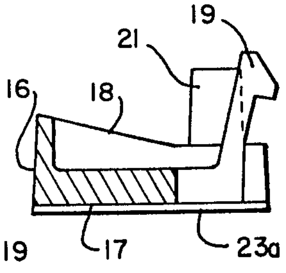
FIG. 5 is a cross-sectional view taken along the line 5—5 of FIG. 3.

A suitable construction for the individual mounting devices is shown in FIGS. 3-5. The body 16 is made of suitable die molded plastic material. It has a flat front surface 17, and a rear surface 18 which has a configuration compatible with the configuration of the adjacent portion of the bezel. A spring latch 19 extends from the rear side of the body, and may be molded integrally with the main portion of the body. Also, locating posts 21 extend from the rear side of the body, and may be made integral therewith. These posts are located adjacent the latch as shown in FIG. 4. As shown in FIG. 2, the bezel is provided with a plurality of holes 22 which may be rectangular in configuration. Such holes are provided for the mounting of the prior art devices previously described. Two such holes may be provided in each side portion of the bezel, behind the areas indicated by dotted lines in FIG. 1. When a mounting device is secured to the bezel, the latch 19 and the locating posts 21 are thrust through the opening, and the latch then springs to the locking position shown in FIG. 2. Thereafter the mounting device is permanently attached to the bezel, although it can be removed by the use of a suitable tool.

The fastening means for securing the panel to the mounting device 13 is of the loop and the hook type, such as is commonly used on garments. The two parts 23*a* and 23*b* of this fastening means are adhesively secured respectively to the front surface of the mounting device, and to the rear surface of the panel 14. The location of the parts 23*b* on the panel are such that they are brought in proper apposition to the parts 23*a* on the mounting devices 13, when the panel is properly applied. As is understood by those familiar with fastening devices of the loop and hook type, the parts 23*a* and 23*b* are relatively thin strips, which can be readily adhesively secured respectively to the panel 14 and to the flat front surfaces of the mounting devices on the rear side of the panel. The parts which preferably are secured to the mounting devices have a multitude of filamentary hook-like elements, and the other parts secured to the panel have a multitude of loop-like elements. When the two parts are manually pressed together, there is sufficient retention to adequately hold the panel upon the terminal. The construction of such fastening means and the principles employed are employed in the "Velcro" and "Scotchmate" fasteners used with garments.

It will be evident that a complete assembly as illustrated in FIGS. 1 and 2, and the mounting devices, have a number of advantages. The strips 23 that are attached to one side of the panel 14 do not interfere with laying the panel upon a flat surface for cleaning the front side.

The adhesively secured parts **23*b*, because of their dimensions, are not apt to be broken or mutilated during handling or storage. The application and removal of a panel is a simple manual operation, and does not involve alignment of projecting devices with the several holes in the bezel. It merely involves simple alignment of the two parts 23*a* and 23*b* with manual pressure sufficient to obtain the desired retention. A panel can be readily manually removed simply by supplying sufficient force to cause separation of the parts 23*a* and 23*b***.

What is claimed is:

1. An assembly comprising visual display means having an illuminated display area and a bezel surrounding the area, the bezel having holes located at spaced regions, mounting devices secured to the bezel, each device having portions extending within and locked within the holes, each mounting device having a flat front face, the faces of all the devices being substantially contiguous to a common plane spaced forwardly of the bezel, the front face of each mounting device having adhesively secured thereto a strip of securing means of the hook and loop type, a substantially flat antiglare panel, the rear surface of the panel having a plurality of strips adhesively secured to the same and being of the hook and loop type, the strips on the panel being located whereby the panel can be pressed against the mounting devices, with the strips on the panel being applied to and retained by the strips on the mounting devices, said strips forming the sole means for removably supporting and retaining the panel in a position in front of and spaced from the display area.

2. A mounting device as in claim 1 in which said mounting devices carried by the body each include a latch for locking the same to the bezel and locating posts for insertion in the opening in the bezel.

* * * * *